Dec. 8, 1931.  G. A. STACKHOUSE  1,835,819
MACHINE AND METHOD OF ASSEMBLING SPRINGS
Filed March 5, 1930  2 Sheets-Sheet 1
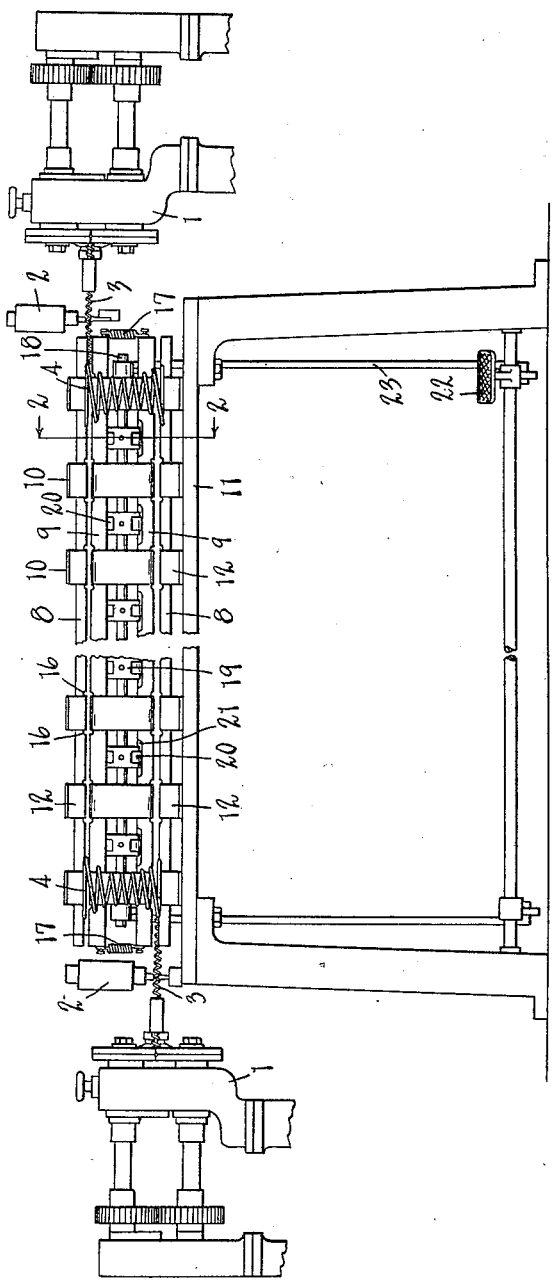
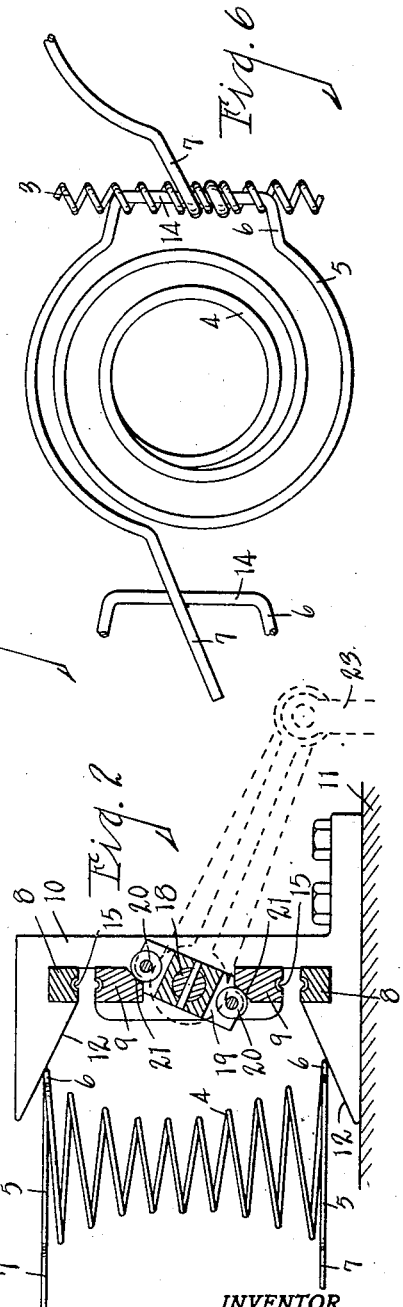
INVENTOR
*George A. Stackhouse,*
BY
*Chappell Earl*
ATTORNEYS Dec. 8, 1931.  G. A. STACKHOUSE  1,835,819

MACHINE AND METHOD OF ASSEMBLING SPRINGS

Filed March 5, 1930  2 Sheets-Sheet 2

INVENTOR
George A. Stackhouse,
BY Chappell Earl
ATTORNEYS

Patented Dec. 8, 1931

1,835,819

UNITED STATES PATENT OFFICE

GEORGE A. STACKHOUSE, OF OAKLAND, CALIFORNIA, ASSIGNOR TO L. A. YOUNG SPRING & WIRE CORPORATION, OF DETROIT, MICHIGAN

MACHINE AND METHOD OF ASSEMBLING SPRINGS

Application filed March 5, 1930. Serial No. 433,244.

The main objects of this invention are:

First, to provide a machine for assembling spring structures for use as mattress fillers or cushions which is of large capacity and insures a uniform product.

Second, to provide a method of assembling spring cushion structures which may be practiced with a minimum of effort and labor on behalf of the operators, and at the same time results in a highly satisfactory product.

Objects pertaining to details and economies of my invention will definitely appear from the description to follow. The invention is defined in the claims.

A structure which embodies the features of my invention and illustrates the manner of carrying out the method of assembling springs is clearly illustrated in the accompanying drawings, in which:

Fig. 1 is a fragmentary front elevation of a machine or apparatus embodying the features of my invention.

Fig. 2 is a fragmentary vertical section on line 2—2 of Fig. 1 with the chucks open and illustrating the method of engaging the springs to be assembled with their supporting chucks.

Fig. 6 is a fragmentary plan view illustrating another step in the assembling of the springs.

Figure 3:
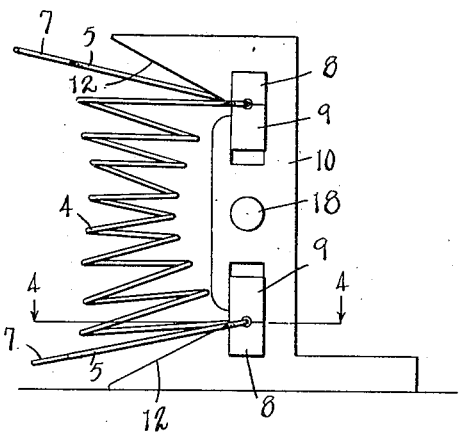
Fig. 3 is a fragmentary end view with the chucks or jaws closed.
Figure 5:
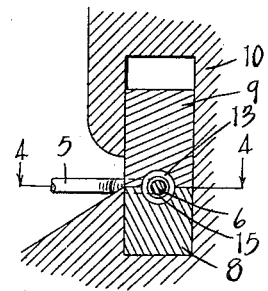
Fig. 5 is a detail section on line 5—5 of Fig. 4.

Referring to the drawings, 1, 1 designate spring coiling machines and 2 indicates cutthe relatively fixed chuck members 8 which The coiling machines 1 are shown mainly in conventional form, and are adapted to form helically coiled springs 3, the springs being formed with open coils. These springs are formed of suitable gage wire to constitute cross members of the assembled spring structure, fragments of which are illustrated in Fig. 6 and made the subject matter of my copending application for Patent Ser. No. 433,245 filed March 5, 1930, for machine and method of assembling springs now Patent No. 1,812,611, dated June 30, 1931.

The body springs 4 illustrated are of the hour-glass type. The end coils 5 of these body springs have offsets 6 therein, the reaches of the offsets being straight. The end coils 5 terminate in laterally offset tie members 7 which are spirally coiled about the offsets 6 of adjacent springs as shown in Fig. 6, where the tie member of one spring is shown engaged at the right of the figure and prior to engagement at the left of the figure.

As the springs 3 are formed and projected from the coiling machine they are projected into spring supporting chucks consisting of the relatively fixed chuck members 8 which are disposed in opposed pairs, and the slidably supported chuck members 9 disposed in opposed relation to the chuck members 8 to coact therewith. These chuck members are mounted in uprights 10 carried by the bed 11 of the machine. The uprights have forwardly projecting inclined guide arms 12 facilitating the introduction of the springs to the chuck.

The chuck members have complementary spiral grooves 13 therein adapted to receive the helically coiled springs 3 and, as they are rotated and projected from the coiling machine, they are uniformly advanced through the chuck and engaged with the offsets 14 of the body springs to be connected.

Figure 4:
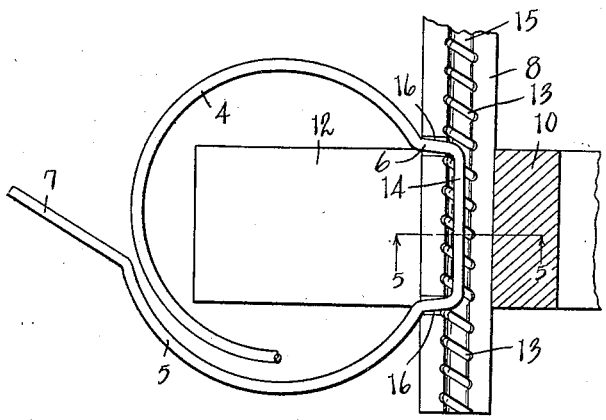
Fig. 4 is a fragmentary section on line 4—4 of Figs. 3 and 5 illustrating details of the chuck and the relation of the springs to be connected thereto.

The chucks have longitudinal grooves 15 adapted to receive the reach portions of the offsets and slots 16 for the springs as shown in Fig. 4 so that portions of the springs are supported centrally of the spiral groove in the chuck.

The jaw members are opened by means of the coiled springs 17 and closed by means of the rockshaft 18 disposed longitudinally between the movable jaw members and having crossheads 19 thereon provided with rollers 20 coacting with the cam surface 21 on the chuck members 9 so that, by actuating the rockshaft through the foot pedal 22 and the connecting link 23, the chuck members are closed. This supports the springs so that their offsets are engaged by the cross members 3 as they are formed and projected from the coiling machines.

The structure illustrated is designed to connect both the tops and bottoms of the body springs.

After the springs 3 are engaged with the body springs the tie members 7 are wrapped helically around the offsets between the coils of the cross members.

My improved machine and method for assembling springs not only enable very rapid production of the assembled spring units but a very uniform product with a minimum of handling and labor.

I have not attempted to illustrate and describe certain modifications which I contemplate as it is believed that this disclosure will enable those skilled in the art to embody or adapt my improvements as may be desired.

Having thus described my invention what I claim as new and desire to secure by Letters Patent is:

1. The method of assembling helical springs having end coils terminating in laterally disposed tie members and having offsets in such end coils opposite such tie members, consisting of arranging the offsets of a plurality of springs in a chuck having a spiral groove therein, rotating and advancing a spirally coiled spring cross member in said chuck whereby it is engaged with the offsets of the several springs, and wrapping the tie members of adjacent springs spirally around said offsets between the coils of said cross member.

2. The method of assembling helical springs having end coils terminating in tie members and having offsets in such end coils opposite such tie members, consisting of arranging the offsets of a plurality of springs in a chuck having a spiral groove therein, rotating and advancing a spirally coiled spring cross member in said chuck whereby it is engaged with the offsets of the several springs, and wrapping the tie members of adjacent springs around said offsets between coils of said cross member.

3. In a spring assembling machine, the combination of a plurality of spaced uprights, chuck members mounted on said uprights in inwardly facing opposed relation, coacting chuck members slidably mounted on said uprights, said chuck members having spiral grooves therein adapted to receive a rotating helically coiled spring and advance the same through the chucks and longitudinal grooves adapted to support portions of springs to be connected in alinement within said chucks and centrally thereof, said uprights having opposed outwardly diverging arms constituting guides facilitating the positioning of the springs within the chuck, springs acting to retract said slidably mounted chuck members, and a rockshaft disposed longitudinally between said slidably mounted chuck members and having cross heads thereon provided with rollers, said slidably mounted chuck members having cam portions coacting with said rollers.

4. In a spring assembling machine, the combination of a plurality of spaced uprights, chuck members mounted on said uprights in inwardly facing opposed relation, coacting chuck members slidably mounted on said uprights, said chuck members having spiral grooves therein adapted to receive a rotating helically coiled spring and advance the same through the chucks and longitudinal grooves adapted to support portions of springs to be connected in alinement within said chucks and centrally thereof, springs acting to retract said slidably mounted chuck members, and a rockshaft disposed longitudinally between said slidably mounted chuck members and having cross heads thereon provided with rollers, said slidably mounted chuck members having cam portions coacting with said rollers.

5. In a spring assembling machine, the combination of a plurality of spaced uprights, chuck members mounted on said uprights in inwardly facing opposed relation, coacting chuck members slidably mounted on said uprights, said chuck members having spiral grooves therein adapted to receive a rotating helically coiled spring and advance the same through the chucks and longitudinal grooves adapted to support portions of springs to be connected in alinement within said chucks and centrally thereof, and means for actuating said slidably mounted chuck members.

6. The method of assembling helical springs having end coils terminating in tie members and having offsets in such end coils opposite such tie members, consisting of arranging the offsets of a plurality of the springs in alignment with each other in a plurality of adjacent rows, rotating and advancing individual spirally coiled spring cross members into engagement with the aligned offsets of each the several rows of springs, and then wrapping the tie members of adjacent springs in adjacent rows around said offsets between coils of said cross members.

In witness whereof I have hereunto set my hand.

GEORGE A. STACKHOUSE.